United States Patent [19]

Arnaud

[11] 4,030,267
[45] June 21, 1977

[54] MOLDED PACKAGING SYSTEM
[76] Inventor: Guy Arnaud, Magnieu, Ain, France
[22] Filed: Oct. 16, 1975
[21] Appl. No.: 623,102

Related U.S. Application Data

[63] Continuation-in-part of Ser. No. 315,899, Dec. 18, 1972, Pat. No. 3,952,082.

[30] Foreign Application Priority Data

Dec. 16, 1971 Switzerland .................. 18363/71

[52] U.S. Cl. .................................. 53/27; 53/14;
   53/34; 53/36; 53/133; 53/170; 264/46.6
[51] Int. Cl.² ........................................ B65B 23/00
[58] Field of Search ............... 264/46.6, 45.2, 45.6,
   264/41, 54, 257, 275, 46.6; 53/14, 122, 27,
   32, 36, 34, 140, 170, 133, 134, 175; 206/524;
   249/113, 141; 425/4, 817 R

[56] References Cited
   UNITED STATES PATENTS

| 1,163,198 | 12/1915 | Atterbury | 249/113 |
|---|---|---|---|
| 2,600,265 | 6/1952 | Randall | 249/113 |
| 2,983,963 | 5/1961 | Jodell et al. | 264/46.6 X |
| 3,204,385 | 9/1965 | De Remer et al. | 53/36 X |
| 3,641,725 | 2/1972 | Grisell | 53/36 X |
| 3,737,266 | 6/1973 | Yamamoto | 425/817 R |
| 3,844,523 | 10/1974 | Wilheim | 249/113 |
| 3,932,252 | 1/1976 | Woods | 264/46.6 X |
| 3,941,528 | 3/1976 | Cotterell | 249/141 X |
| 3,952,082 | 4/1976 | Arnaud | 264/46.6 |

FOREIGN PATENTS OR APPLICATIONS

691,651   7/1964   Canada .................. 53/36

*Primary Examiner*—Othell M. Simpson
*Assistant Examiner*—Horace M. Culver
*Attorney, Agent, or Firm*—Karl F. Ross; Herbert Dubno

[57] ABSTRACT

An object to be packaged is suspended in an upwardly open mold whose walls are formed with an array of throughgoing perforations and lined with a gas-pervious sheet. A similarly perforated and lined cover is placed over the mold and foamable polyurethane material is poured into the mold through an elastic hose-like conduit connected to a filling aperture on the mold cover. This material expands within the mold completely filling the space around the object and thereby forms a fitted package around the object. The gas-pervious sheet material lining the mold may be a plurality of synthetic-resin panels formed of parallel inner and outer walls spaced apart by parallel webs defining between the inner and outer walls a plurality of parallel passages. These inner and outer walls are formed with throughgoing perforations opening into the passages so that as the synthetic-resin material expands it passes through the perforations on the inner walls only and projects into the passages.

5 Claims, 15 Drawing Figures

MOLDED PACKAGING SYSTEM

CROSS-REFERENCE TO RELATED APPLICATIONS

This application is a continuation-in-part of my copending patent application Ser. No. 315,899 filed Dec. 18, 1972. And now Pat. No. 3,952,082.

FIELD OF THE INVENTION

The present invention relates to an expanded resin package for an object, which package is usable as a shipping container. More specifically this invention concerns a method of and apparatus for forming such a package.

BACKGROUND OF THE INVENTION

There is an increasing trend toward the use of expanded synthetic resins for manufacturing miscellaneous bodies such as packages, structures and wall elements, containers, or various receptacles. Most of these bodies have an irregular outer surface which cannot be written on or otherwise carry legible inscriptions concerning the product enclosed therein, its destination, or its manufacturer. At the same time such containers are so soft that the handling incident to shipping often scratches them up so badly that they are quite unattractive, if they have not opened by themselves.

Packages consisting essentially of shells or half-casings of expanding synthetic resin, e.g. foamed urethane, are already know and widely used. Due to their poor mechanical strength these shells or half-casings are not used as widely as could be desired. Each shell or the like may contain several objects in different respective cavities or cutouts, but can only be used for packing objects having a well-defined shape. If this shape is modified a new package must be prepared. This limits considerably the use of such packages since a great many different types must be kept on hand and they must also be shipped in their own cartons so that they may be marked and so that the soft foam will not be ruined.

A known packing method consists in utilizing polyurethane as a filler between the objects to be protected and a fluid-tight case. The objects are enclosed in a fluid-tight envelope from which the air is removed as much as possible by an expensive vacuum pump. Then the bagged object is placed in the case on blocks or wedges, the interior of the case being lined with some kind of sheet material acting as a mold-release agent. The reagent mixture is then introduced slowly into the case in order to fill it completely and prevent the formation of air pockets or bubbles. A lid is then nailed in place and the entire mass is allowed to cure.

Although such a package is generally considered to be very good, it has certain disadvantages. The blocks or wedges supporting the object on the bottom of the case transmit shocks due to handling directly to the object. In addition opening such a package is quite difficult since chunks of the packaging foam must be cut away, which is quite dangerous the closer the unpackager gets to the object.

OBJECTS OF THE INVENTION

It is therefore an object of the present invention to provide an improved package and a method of a apparatus for making same.

Another object is the provision of such a package which is easy to open.

Yet another object is to provide a packaging method which can be used with a variety of different objects having different shapes.

A further object is to provide a package which can be written on and which resists surface scratching.

SUMMARY OF THE INVENTION

The package according to the present invention comprises a hollow foamed synthetic-resin mass completely surrounding the body and covered with an envelope which is bonded to it and permits the package to be marked while protecting it from scratching or other damage. A plurality of filaments or thread-like elements are imbedded in the mass and extend under the object packed so that they can be pulled up and serve to cut the object free of its packaging, while they can also serve for picking up of the packaged objects by means of a crane or the like.

With this arrangement as the expanded resin polymerizes, the thread-like elements serve to support the object but they do not transmit to the object shocks and stresses.

The mold for carrying out this method comprises an open-top box or vessel having side walls and a lid, all formed over their entire surfaces with an array of throughgoing perforations. The lid is adapted to be detachably locked on the vessel and is formed with at least one filling aperture. The aggregate cross-sectional area of the perforations is a multiple of the cross-sectional area of the filling aperture.

According to another feature of the invention, the filling aperture formed through the cover is associated with a pouring duct consisting of a tubular section of flexible, elastic material provided at one end with an annular rib adapted to co-act with the outer face of the cover for locking said duct to this cover and adjacent thereto with a resilient radial skirt adapted to clamp against the inner surface of the cover at the edge of the cutout formed in the porous envelope under the cover opening, The other end of said tubular section is adapted, after filling of the mold with the reaction mixure, to be sealed by pinching so that this tubular duct consititutes an expansion-type pressure-regulating chamber.

Thus, when the reaction mixture has been poured into the mold, the flexible pouring duct is closed and sealed by pinching its free outer end and then constitutes an elastic expansion chamber adapted to prevent any undesired and detrimental overpressure from develping within the mold either in case of a faulty metering of the mixture or from excessive heating of the mold or product such that the expansion is increased. A plurality of pouring ducts of this character may be disposed at spaced intervals in certain areas of the mold for constituting a plurality of expansion chambers and avoiding local overpressures.

According to yet another feature of this invention the gas-previous sheet lining the mold is formed of a plurality of rigid planar panels each in turn formed of an outer wall, an inner wall, and a plurality of parallel webs extending between these walls and defining therebetween a plurality of a parallel passages. The inner and outer walls are formed with throughgoing perforations in a regular array that open into the passages. The perforations are dimensioned such that on expansion of the polyurethane material within the mold this material is forced through the perforations in the inner wall into the passages and there forms small rivet-like heads that rigidly secure the panels to the polyurethane body.

BRIEF DESCRIPTION OF THE DRAWING

The above and other objects, features and advantages will become more readily apparent from the following description, reference being made to the accompanying drawing in which.

SPECIFIC DESCRIPTION

To manufacture the packing of this invention a porous mold 1, for example of perforated sheet-metal, is used. Its inner walls are rigid and lined with a porous envelope 2 consisting, for example, of burlap for a purpose explained below. When the mold has concave or convex surfaces, this cloth 2 is made to conform to the mold's contours. The mold, having the general configuration of an open-top box, is associated with a cover of lid 6 and comprises wall elements either hinged together or simply detachable from one another for mold-stripping purposes.

It may be noted that if the mold shape is developable it is possible to use a cloth 2 of relatively simple shape, for example rectangular.

Figure 1:
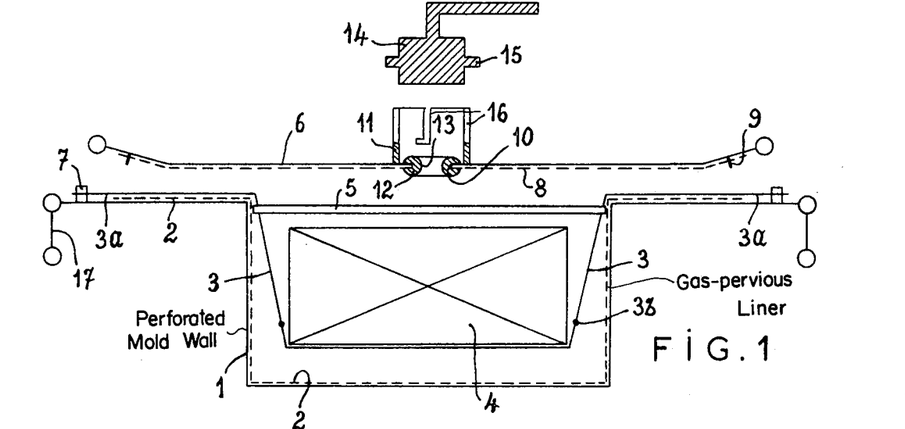
FIGS. 1 and 2 are sectional views illustrating two steps of the method of manufacturing a first embodiment of the packing.
Figure 2:
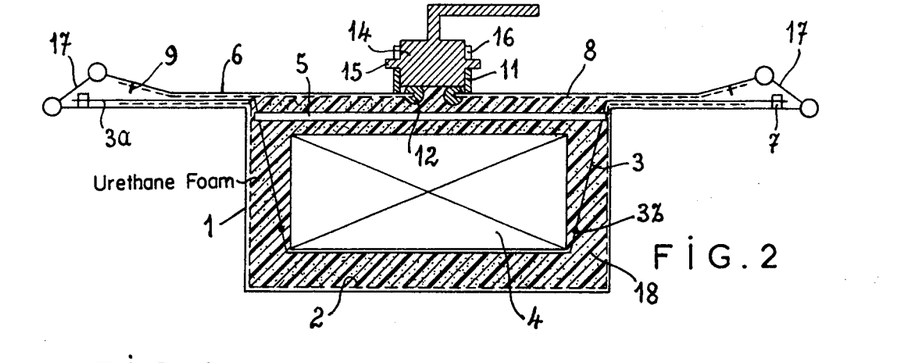
Figure 3:
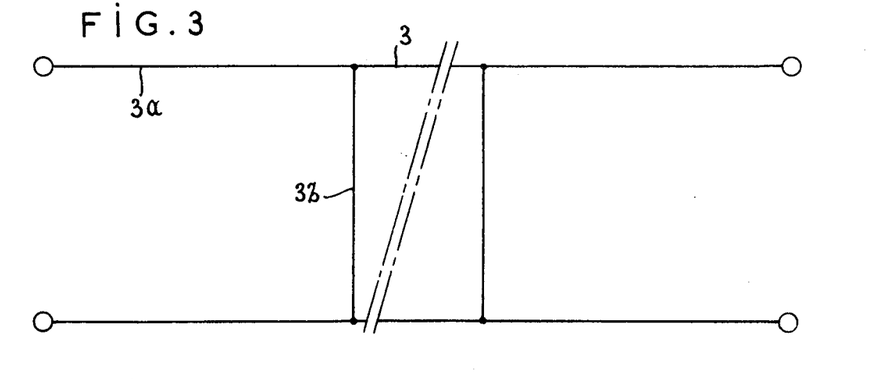
FIG. 3 is a view from above showing the means for suspending the object in the packing illustrated in FIGS. 1 and 2.
Figure 12:
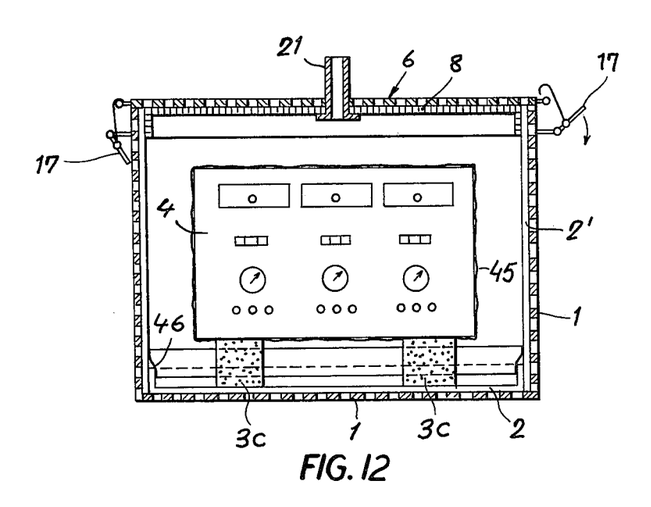
FIG. 12 is a view similar to FIG. 1 illustrating another arrangement in accordance with this invention.
Figure 13:
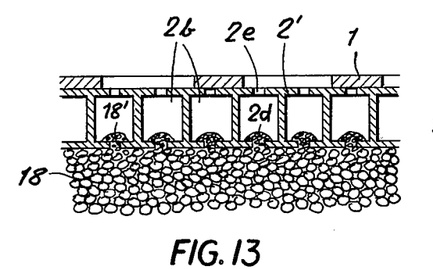
FIG. 13 is a large-scale view of a detail of the package formed by the arrangement of FIG. 12.

When the mold has thus been lined, a number of thread-like or filamentary elements 3 are disposed therein. The free ends 3a of these elements 3 project from the mold, as illustrated in FIGS. 1 and 2, and are fastened temporarily, for example by means of clamps 7 carried by the mold 1. These elements may consist of belts, string, threads or wires extending longitudinally and/or transversely to the mold, and possibly interconnected by means of intermediate elements 3b, as shown in FIG. 3. Blocks 3c *l of rigid polyurethane foam may replace the element 3 as shown in FIG. 12*.

Under these conditions, the object 4 to be packed, wrapped beforehand in a polyethylene envelope 45 (FIG. 12) not liable to adhere to the expanded resin to be subsequently poured into the mold, is rested on the portions of thread-like elements 3 which lie within the mold, as illustrated in FIG. 1. Spacers or distance-pieces 5 may be disposed above the object 4 and between the taut portions of the filaments 3.

The mold 1 is then closed by applying the cover or lid 6 thereto, this cover 6 being also perforated and having its inner face lined with a porous envelope 8 tensioned on it by means of hooks 9 disposed along its periphery. This cover 6 is formed with an opening 10 which, in this embodiment, is associated with a tubular duct 11 also rigid with said cover. The porous envelope 8 is formed with an opening registering with the cover opening 10 and having its edge clamped against the edge of the cover opening by a ring 12 of flexible and elastic material. This ring 12 is formed with a central opening 13 constituting the pouring orifice. Moreover, it constitutes the seat of a detachable plug 14 adapted to fit into the tubular duct 11 and formed with means for interlocking this plug and duct, such as radially projecting studs 15 coacting with corresponding retaining notches 16 of said duct, as in a bayonet mounting.

When the cover 6 is fitted to the mold 1 and locked thereto for example by means of releasable fasteners 17 illustrated diagrammatically in FIGS. 1 and 2, the reaction mixture is poured through the orifice 13 of ring 12. Upon completion of this one-shot molding operation the plug 14 is fitted in position and locked to prevent any escape of resin 18 during its expansion, this resin completely surrounding the object 4 to be packed.

It will be noted that the air contained in the mold, together with the gas released as a consequence of the expansion of resin 18, can escape very easily through the porous envelope 2 and the mold perforations, so that a particularly low pressure or substantially zero inner pressure is produced inside the mold. In any case, this pressure is not elevated enough to damage the object 4 to be packed. Under these conditions, it is possible to employ quick-expanding reaction mixture compositions. Moreover, during its expansion the resin will conform to the contour of the object to be packed so that this object is encapsulated by the hollow body and the resin becomes bonded to the envelope 2 without flowing therethrough, so that under no circumstances can this envelope be embedded in the resin. As a consequence of the low expansion pressure the resin causes the porous envelope to form a boss at each perforation of the mold walls, these bosses assisting in improving the strength of the packing and also its adherence to the surfaces likely to support it.

Upon completion of the polymerization, the mold is opened and dismantled, and the packing thus formed is removed or stripped. The resin mass is thus integral with the porous envelope which can receive any inscription permitting identification of the contents, its destination, or the manufacturer of the package, and at the same time efficiently protects the relatively soft resin constituting the packing.

From the foregoing it is clear that the function of the porous envelope 2 is to reinforce the expanded synthetic resin, to permit the escape of air and gas therefrom during the molding operation and to prevent any undesired contact between the expanded resin and the mold. it may be pointed out that the porosity of this cloth must be determined so that it can efficiently permit the escape of gas and air during the molding operation while preventing the escape of the expanding resin. Moreover, the mold must also have a porosity sufficient to avoid any interference with the gaseous outflow, for this interference would add itself to the retarding action exerted by the porous envelope. In fact, if the foam were retained unduly by the air pressure prevailing in the mold it might complete its polymerization before it has filled the mold completely, a condition requiring the use either of overfilling material or of a reaction mixture producing a higher pressure, at the expense of the object to be packed which might not withstand this excessive pressure.

It will be seen that in the packing thus obtained the thread-like elements 3 constantly support the object 4 resting thereon, and that these elements 3 can also be used for suspending or gripping the packing proper by means of their ends 3a projecting from the packing. This arrangement is advantageous in that it avoids the transmission of any undesired shocks to the packed object and, more particularly, the integral transmission to this object of the shocks received by the packing during the handling and transport thereof.

Figure 4:
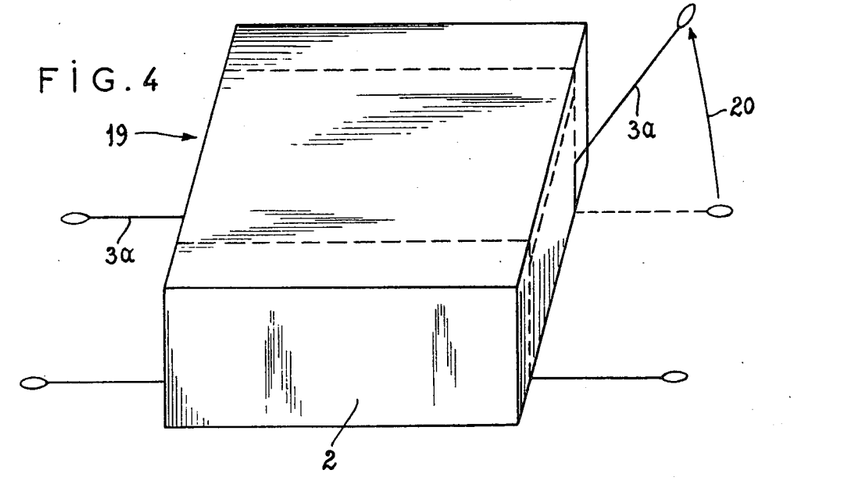
FIGS. 4 and 5 are perspective views of the complete packing, at the beginning and during the opening operation, respectively.
Figure 5:
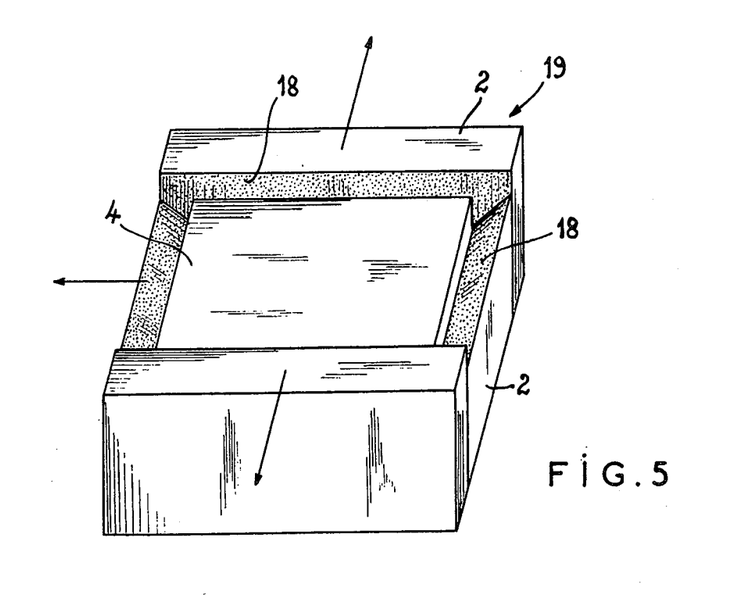

FIG. 4 illustrates the packing 19 after completion, mold-stripping and turning upside down. The expanded resin constitutes a hollow body enclosing the object completely, so that only the outer sections 3a of the thread-like elements 3 project therefrom to permit its opening. In fact, by pulling the ends 3a of these thread-like elements 3 upwardly, as shown by the arrow 20 of FIG. 4, these elements will cut the hollow body along the dotted lines shown in this Figure, so as to cut free pieces of the material which, after removal, permit the packed object 4 to be removed.

Preferably, this operation is facilitated by cutting score lines on the outer surface of the porous envelope and also by proper instructions printed thereon. It will be seen that when the tearing strength of the porous envelope is such that the latter cannot be cut by means of the thread-like elements 3, this envelope must be cut by using a suitable tool before cutting the packing proper by means of said elements 3.

In the foregoing it is mentioned that the porous envelope consisted of burlap of jute cloth, but it will readily occur to those skilled in the art that any other suitable textile sheet material, woven or not, or even a rigid partition or wall material having a natural porosity or rendered porous throughout or on its surface, may be used. Moreover, although polyurethane constitutes the preferred expansion resin, any other suitable synthetic resin may also be used, provided that it yields a low-pressure, quick-polymerizing and expanding foam material.

The packing according to this invention is particularly economical, for it requires only cheap materials easily available everywhere. Polyurethane, the most expensive among the materials constituting this packing, is of particularly low cost in a quality perfectly suited for this application. Its compressive strength (without deformation) is about 300 kg. per sq. deciter (42.67 psi), corresponding to a density of about 20 kg. per cu. m. (0.246 lbs. per cu. ft.). Jute cloth, having a cost varying considerably with its quality, has an amply sufficient resistance. The cost of the thread-like elements constitutes but a very low percentage of the total cost of this packing. These elements may consist for instance of vegetable or synthetic fibers, or under special circumstances of mild steel in the form of binding wire when a relatively heavy object has to be supported. The distance-pieces consisting for instance of wood are cheap elements and may even be dispensed with when the objects to be packed are relatively light in weight. The cost of the synthetic envelope wrapping the objects is practically negligible.

The body 18 after polymerization of the resin has a weight between 30 g and 50 g per dm$^3$. The foam is rigid and has at least 96% of its cells closed so that it protects the object 4 very effectively from moisture.

It is noted that this closed-cell structure cannot be formed unless the gas generated during expansion of the resin is allowed to vent out in virtually every direction. Thus the provisions or arrays of perforations covering all of the walls and cover of the mold allow venting of this gas generated during expansion of the synthetic-resin material. In the formation of prior-art open-celled bodies the generated gas may be vented at a single location in the body.

Moreover, this packing is attended by several advantageous features. Thus, the fact that it can be transported by using the tread-like elements is particularly important for with the packed object bearing on these elements it is possible to provide a very light protection, irrespective of the load comtemplated. In addition the same technique and in most instances the same mold may be used for various purposes since the packing is not limited from the dimensional point of view. Thus, with this packing it is possible to protect for example an aircraft jet engine as well as a precision clock, the only difference lying in the choice of basic materials. Furthermore, it is an easy matter to render the package and its content floatable. Very special packings, such as those either intended for jettisoning miscellaneous products and articles or those exposed to severe shocks, may be obtained very easily since polyurethanes having a wide range of very diversified properties are available in the trade. If it is desired to protect relatively small articles in a common package, the thread-like elements may constitute a net without appreciably increasing the cost of the packing. In contrast to known polyurethane packings the packing of this invention can be opened in a particularly safe and quick manner. After the removal of the object or objects contained therein, this packing can be destroyed completely by burning, except under specific circumstances or when the delivery of goods in fire-proof or self-extinguishing materials is required by official regulations. Finally, from the point of view of safety, the risk of injuring an operator during the handling or the opening of this packing is definitely precluded.

Figure 6:
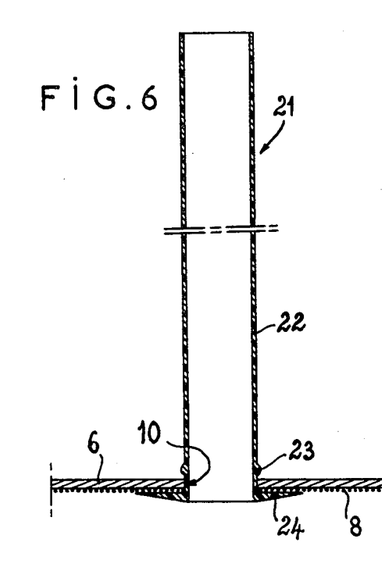
FIGS. 6 and 7 are fragmentary vertical sections showing in enlarged scale a modified embodiment of the pouring duct associated with the mold of FIGS. 1 and 2.
Figure 7:
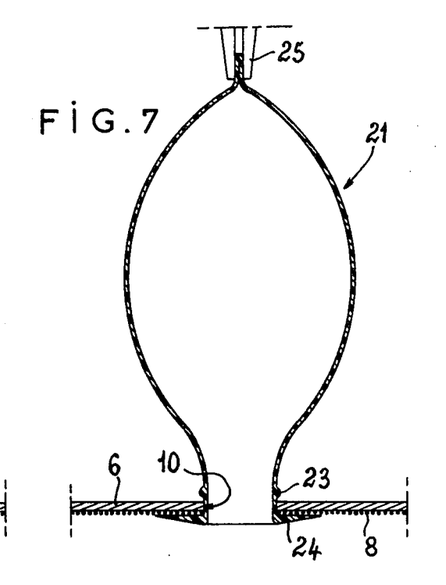
Figure 8:
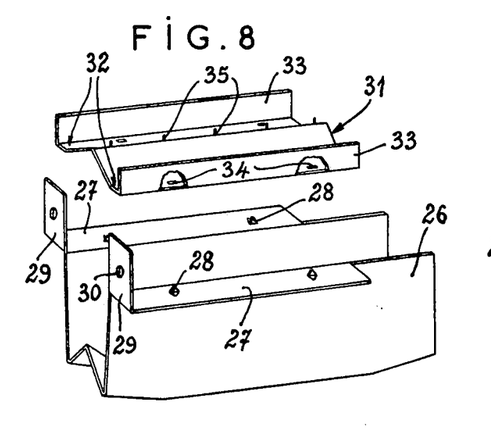
FIG. 8 is a perspective and exploded view of a leg according to another emodiment of the present invention.

The mold 1, whose porosity permits the escape of any air trapped therein during the pouring operation to avoid the formation of cavities in the hollow body thus produced, is utilized in combination with a pouring duct 21 shown in FIGS. 6 and 7. This duct comprises essentially a tubular element 22 of flexible and elastic material and having an annular rib 23 formed on its outer wall adjacent to its lower end and an elastic radial flange 24 at this end. As illustrated in FIG. 6, this duct projects somewhat with its free end through the opening 10 formed in the mold cover 6 until its outer annular rib 23 lies just outside this cover and its flange 24 bears against the undersurface of the edge of the cutting formed in the porous envelope 8 associated with said cover, as already explained in the foregoing. Thus, due to the pressure created by the expanding polyurethane poured into the mold, this flange 24 is pressed with force against the inner surface of cover 6 and holds in proper position the porous envelope 8. Upon completion of this pouring operation, the upper end of the tubular duct 22 is sealed by using a clamp or pliers 25, as shown in FIG. 7. The pouring duct 21 thus constitutes an expansion regulating chamber capable of preventing overpressures from developing inside the mold, notably in case of faulty metering of the polyurethane mixture or when the temperature of this mixture and/or of the mold is such that the expansion is increased unduly.

It should be pointed out that fitting the pouring duct 21 is easier than fitting the ring 12 described hereinabove with reference to FIGS. 1 and 2. Of course, the inherent elasticity of this pouring duct 21 is determinative of the maximum pressure to be obtained in the mold. After the expanded resin has polymerized, the duct 21 is cut off flush with the cover 6, just above the annular rib 23, to permit the stripping of the resulting article. If necessary, and notably to avoid local overpressures, ducts similar to this duct 21 may be engaged through respective openings formed at other points in the cover 6 for constituting supplementary expansion pressure regulating chambers.

When this manufacturing method is carried out for making packings of relatively heavy and cumbersome or bulky objects, the mold 1 comprises in its lower wall openings permitting the passage of legs having one portion embedded in the expanded resin. A typical form of embodiment of these legs is illustrated in FIGS. 8 – 11. In this example, each leg 26 is of substantially U-shaped cross section with substantially vertical wings rigid with outwardly bent legs or lips 27 extending along at least one fraction of their length and each formed with vertical pressed lugs 28. Each ledge 27 comprises at one end an upstanding flap 29 having a substantially central orifice 30 formed therethrough. Each leg 26 is used in conjunction with a complementary reinforcing member or top plate 31 having a V-shaped cross section. This reinforcing member 31 comprises on either side substantially horizontal extensions 32 formed at their outer ends with substantially vertical walls or lips 33 adapted to act as anchoring elements. Each horizontal extension 32 has perforations 34 aligned, when the reinforcing member is fitted on top of the corresponding leg 26, with the projecting lugs 28 of the underlying ledge 27. Finally, in its portion constituting the apex of the V, each reinforcing member 31 comprises vertical projections 35 for a purpose explained hereinafter.

Figure 9:
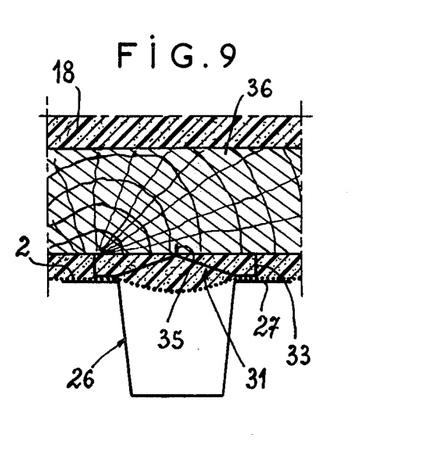
FIG. 9 is a side and cross-sectional view showing the leg of FIG. 8, incorporated in the packing.

Each leg 26 engages an aperture formed in the bottom wall of the mold, near the corners thereof, before the porous envelope 8 if fitted thereto. After fitting the envelope 8 to the bottom of mold 1, the reinforcing member 31 is fitted in turn, as shown in FIG. 9. Then, the projecting lugs 28 of leg 26 which facilitated the positioning of said reinforcing member 31 are upset against the edges of the perforations 34 through which they had been engaged. If it is contemplated to reinforce the bottom of this packing by means of a longitudinal member 36, the latter is advantageously disposed between two legs. In this case, as illustrated in FIG. 9, the longitudinal member 36 is perfectly positioned by the vertical projections 35 of reinforcing member 31.

With this arrangement, when pouring the resin composition 18, the latter flows between the longitudinal member 36 and the component elements of the leg in order to interconnect them.

Figure 10:
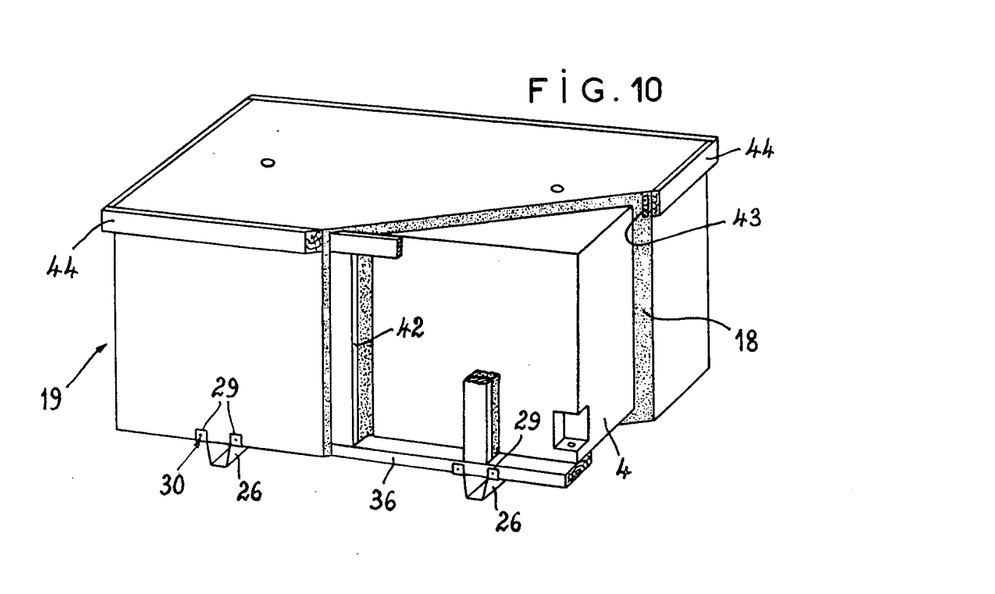
FIG. 10 is a perspective view partly in section showing the other embodiment of the packing.
Figure 11:
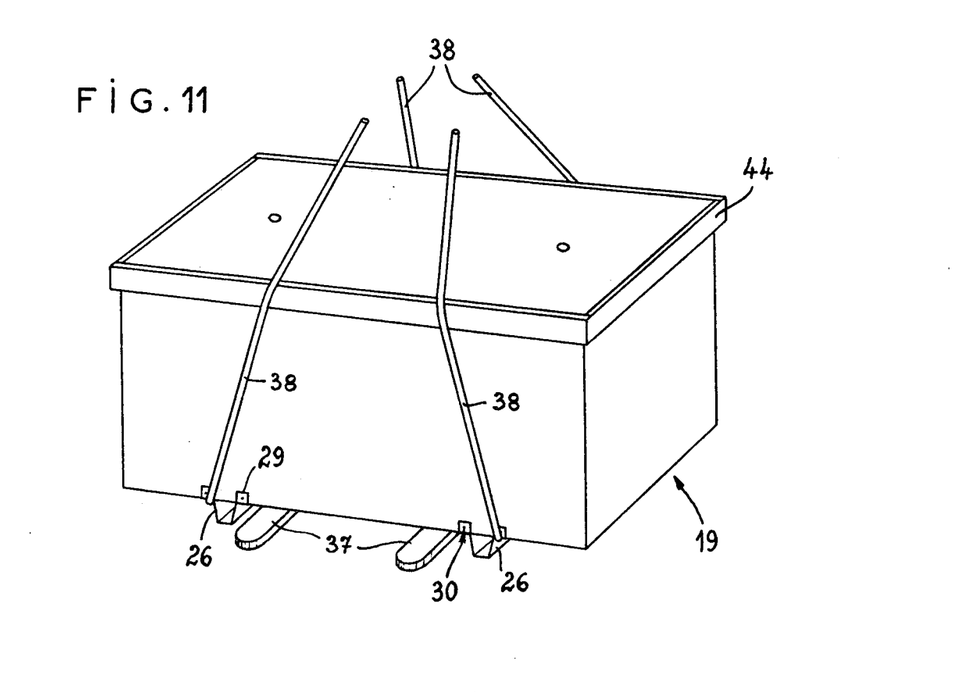
FIG. 11 is a perspective view of the packing of FIG. 10.

After the stripping operation and as shown in FIGS. 10 and 11, the flaps 29 may be fastened to the aforesaid longitudinal member 36 for example by driving nails through their perforations 30.

As shown in FIG. 11, these legs 26 are disposed at a relative spacing sufficient to permit the passage of the forks 37 of a fork-lift truck while permitting a proper positioning of the slings 38 for lifting the packing.

Finally, as shown in FIG. 10, the hollow body enclosing the object to be packed may be reinforced by the provision of the above described longitudinal members 36 as well as uprights 42 and cross-members 43 embedded in the expanded resin. Similarly, especially in the case of particularly heavy and bulky packings, the longitudinal members 36 and cross-members 43 constituting the upper frame of a structure adapted efficiently to reinforce the hollow body may be further reinforced by an external belt element 44 of any suitable type.

The arrangement shown in FIG. 12 uses reference numerals identical to those of FIGS. 1 and 2 for functionally identical structure. In this arrangement, object 4 to be packed is wrapped with a polyethylene foil 45 and supported on blocks 3c of polyurethane foam in the bottom of the mold 1.

Figure 15:
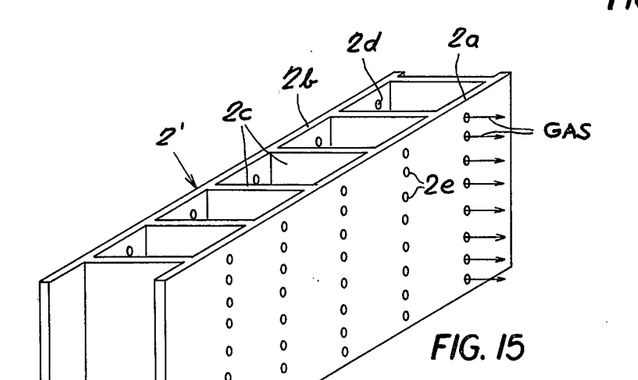
FIG. 15 is a perspective view of a detail of the gas pervious panel used to line the mold of FIG. 12.

This mold 1 is lined with panels 2' of sheet material such as indicated in FIG. 15. Each of these panels 2' has an outer wall 2a, an inner wall 2b, and a plurality of parallel webs 2c interconnecting these walls. The sheets 2' are formed of polypropylene and have perforations 2d in the inner wall 2b and perforations 2e in the outer wall 2a. The perforations 2d and 2e are arranged in rows at the passages 2f formed between the webs 2c. The webs 2c are spaced apart by a distance of 4 mm so that the rows of perforations are similarly spaced apart by a distance of 4 mm, with the perforations of each row being spaced from the closest perforations of the same row by a distance of between 5 mm and 6 mm.

The passages of the sheets 2' lining the sides of the mold are vertical. A contact-adhering tape 46 is applied over the joints between the sheets 2' as shown in FIG. 12.

As the resin expands it forms pockets P of gas adjacent the inner wall 2b of the sheets 2'. This gas passes out through the perforations 2e and 2d and thence through the perforations 1' of the mold. Once all the pockets P have been eliminated the synthetic-resin material 18 pushes through the holes 2d and forms small rivet-like heads within the passages between the webs 2c so as rigidly to secure the sheets 2' to the body 18. It is noted that in passing through the holes 2d the cells of the polyurethane material burst and in this manner form the hard rivet-like heads 18' inside the passages 2f. As soon as the bubbles within the polyurethane burst on forcing of this foam through the small orifices 2d the viscosity of the material increases considerably and further penetration is inhibited so that the passages 2f are not filled completely with the resin and, therefore, the resin does not pass out through the holes 2e.

Figure 14:
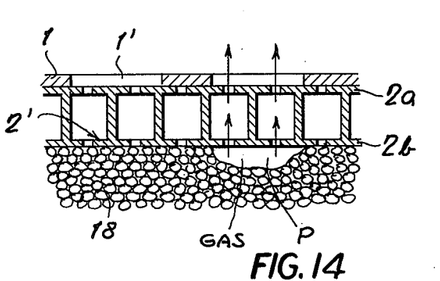
FIG. 14 is a view similar to FIG. 13 illustrating the method in accordance with this invention.

FIG. 14 also shows how the perforations 1' of the walls 1 of the mold are much greater in size than the perforations 2d and 2e through the sheets 2'. This allows easy venting of the gases generated during the expansion of the body 18 out through the sides of the mold so that the body 18 completely fills the interior of the mold. In fact the overall or aggregate area of the perforations 1' is a multiple of the cross-sectional area of the filling tube and is equal to at least 40% of the area of the interior surfaces of the mold 1.

I claim:

1. A method of packaging an object comprising the steps of:
    lining the perforated walls of a mold with a gas-pervious sheet;
    supporting said object in said mold spaced from said sheet;
    thereafter covering said mold with a perforated cover lined with another such gas-pervious sheet, said gas-pervious sheets being constituted by a plurality of flat panels each having an outer wall, an inner wall parallel to said outer wall, and a plurality of parallel webs interconnecting said inner and outer walls and defining a plurality of parallel passages therebetween, said inner and outer walls being formed with throughgoing holes opening into said passages;
    thereafter pouring into said mold over said object foamable polyurethane material;
    thereafter expanding said material in said mold with the generation of gas while venting said gas to the atmosphere over substantially all of the interior surfaces of said mold;
    forcing said material only through the holes of said inner walls into said passages on expansion of said material whereby said passages and the holes of said outer walls remain substantially free from said material; and
    thereafter polymerizing said material into a rigid foam weighing between 30 g and 50 g per $dm^3$ and having a multiplicity of cells at least 96% of which are closed.

2. The method defined in claim 1 wherein said material is poured into said mold through an elastic tube connected to said cover, said method further comprising the steps of pinching-off the outer end of said tube and expanding said tube with said material to maintain the pressure in said mold below a predetermined limit.

3. The method defined in claim 2, further comprising the steps of:
    cutting said tube and the foam therein off flush with said cover;
    removing said cover from said mold after polymerization of said material; and
    removing said object, said sheet, and rigid foam from said mold.

4. The method defined in claim 1 wherein said object is supported on the bottom of said mold on at least one block of rigid polyurethane foam.

5. The method defined in claim 1, further comprising the step or wrapping said object in a fluid-impervious foil prior to supporting said object in said mold and covering said mold.

* * * * *